United States Patent Office 3,231,968
Patented Feb. 1, 1966

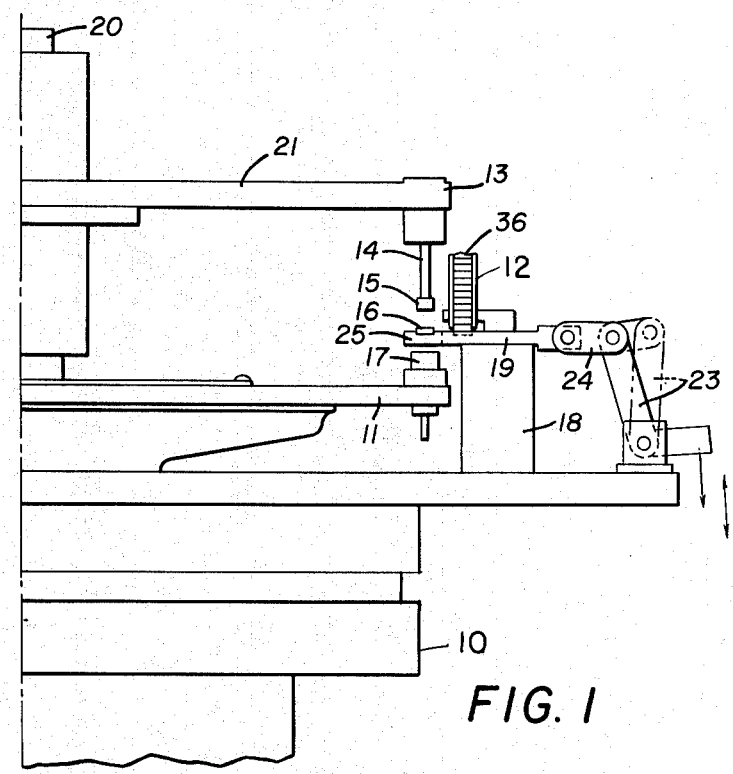
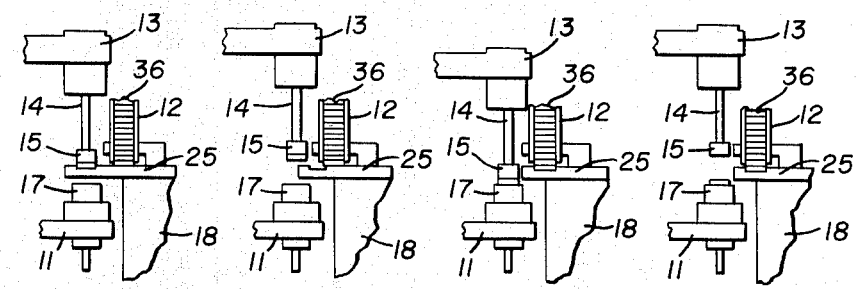
FIG. 2  FIG. 3  FIG. 4  FIG. 5

3,231,968
AUTOMATIC ASSEMBLY CENTER
Douglas L. Swanson, Erie, Pa., assignor to Swanson-Erie Corporation, Erie, Pa., a corporation of Pennsylvania
Filed June 22, 1964, Ser. No. 376,996
5 Claims. (Cl. 29—208)

This invention relates to assembly machines and, more particularly, to assembly machines for utilizing an overhead tool plate in combination with a turret to accomplish a two stage motion for piece part assembly.

This machine constitutes an improvement on the machine shown and disclosed in Patent No. 3,143,792, and Patent No. 3,005,474.

With the machine disclosed herein, it is possible to accomplish a dual motion assembly and yet eliminate one of the tool plates ordinarily necessary to carry out the operation. It also eliminates a number of intermediate work holding escapement fingers which were necessary in previous machines.

The machine disclosed herein is primarily suited for the assembly of relatively small parts at relatively high speed but the machine can be used in assembling the usual sizes of components ordinarily encountered in manufacture.

It is, accordingly, an object of the invention to provide an improved assembly machine.

Another object of the invention is to provide an assembly machine which is simple in construction, economical to manufacture, and simple and efficient to use.

Another object of the invention is to provide an assembly machine which accomplishes a dual motion of assembly of piece parts through the use of a single tool carrying plate and a single indexing turret in conjunction with a feeding mechanism.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a side view of a machine according to the invention;

FIGS. 2, 3, 4, and 5 are schematic views of the feeding mechanism at various stages thereof.

Now with more particular reference to the drawing, the machine shown in FIGS. 1 to 5 is similar in overall construction to the machine disclosed in patent application, Serial No. 198,350. The machine shown herein has a frame 10 on which is supported a circular work holding turret 11 with a suitable indexing mechanism such as shown in the patent application referred to. The turret is indexed about the central support 20. Circular tool plate 21 is reciprocably supported on the center support 20 to move up and down. This up and down motion is generated by a suitable cam such as disclosed in the said patent application.

The tool plate 21 will have the circumferentially spaced heads 15 supported on it. These spaced heads may hold the parts by magnetic, mechanical, or air or vacuum actuated mechanisms. The spaced heads are used for placement of the parts from the bulk of piece parts 36 onto nests 17 as the machine operates. The heads are supported on the shafts 14 which are, in turn, supported from the tool plates 21 at 13.

The piece part feeder hopper or magazine 12 shown in part may be of the vibratory feeder type or any well known feeder suitable for the purpose could be used. These feeder hoppers are spaced around the machine. The feeder supplies the piece parts 16 to an escapement mechanism indicated at the lower end of the feeder 12 and these parts are fed to the transverse slide 25 which slides in the support 18 which is fixed to the machine frame. The slide 25 is actuated through the links 23 and 24 which may in turn be actuated through a drive mechanism connected to the main index drive of the machine.

The turret 11 has the circumferentially spaced piece part receiving members 17 around its periphery and these article receiving members receive the piece parts to be assembled from the head 15.

The machine may be provided with as many heads 15 and as many piece part feeders 12 and as many receiving members 17 around the periphery of the turret as desirable.

In operation, the piece parts may be fed from the feed magazine 12 which could be a hopper, magazine track, or other suitable feed. At each reciprocation of slide 25, the lowermost article in magazine 12 enters the nest in slide 25 and the piece part is fed in the nest to a position directly below the pick-up head 15 which is supported on the reciprocating tool plate 13. Shortly after the piece part is picked up by the head 15, the pick-up head is slightly raised to allow the transfer to return to its original position.

As slide 19 retracts outwardly, the pick-up head 15 begins its descent. As the pick-up head 15 continues to descend, it brings the piece part held by the pick-up head into actual engagement with the piece part in the nest 17.

Actual pick-up by the heads 15 may be accomplished by the use of vacuum or air actuated jaws, mechanically actuated jaws, a magnet, or other suitable means.

After the work transverse slide 25 has returned to a position where the piece part and pick-up head 15 will clear it, the tool plate carrying the pick-up head can again begin a downward path, in this instance traveling beyond its original down position to another and lower position. Here, the piece part held by the pick-up head 15 comes in contact with the work holding nest 17 located on the turret or work transfer means.

It will be readily seen that a generous portion of the cycle of the machine can be used for the escapement or isolation of single piece parts from the stack or track and for the disposing of a single part in the work transfer slide 25. This is extremely advantageous since two critical functions can be accomplished simultaneously rather than in sequence as would normally be the case with many other assembly techniques. It will thus be seen that higher speed for assembly can be attained when the critical operation is accomplished rather than in series with one part of the timing sequence.

After the transfer of the piece part from the pick-up head 15 to the work or piece part holding receiving nest 17 on turret 11, the pick-up head on the tool plate 7 begins its upward travel to a point where it is now in the position shown in FIG. 5. At approximately this point, the work transfer slide 25 begins its inward motion, causing a piece part to be escaped or isolated from the bulk of the piece parts 36 as they are fed from the hopper track, magazine or other feeding device. These feeding devices are spaced around the machine supported on the fixed base 10. The work transfer slide continues to move in until again it is in position under the pick-up head 15 as shown in the drawing and the sequence begins another cycle. This means of piece parts escapement and transfer position into a work holding fixture can then be utilized in a number of similar and multiple positions in a linear fashion or about a turret or rotary type machine. When a multiple number of these devices are used in this type of feeding assembly a high production can be obtained.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An assembly machine comprising
   a work transfer turret on said machine,
   spaced piece part feed means around said machine,
   work transfer members on said machine adjacent each said feed means,
   a tool plate supported on said machine above said turret, cam means for raising and lowering said tool plate,
   said work transfer turret having spaced part holding means thereon,
   index means for indexing said turret to bring said part holding means to rest below each said work transfer means,
   cam means for raising and lowering said tool plate in synchronism with said index movement, of said turret, said feed means comprising a slide,
   and actuating means for said piece part feed synchronized with said index whereby said slide moves a piece part from said feed means to said head, said head removes said piece part from said slide,
   said slide retracting and said head placing said part in said part holding means.

2. A machine for assembling piece parts comprising, in combination,
   a tool plate, a turret, a hopper, and a feeder,
   said turret being disposed in a generally horizontal plane and having a plurality of spaced article receiving members on the upper surface thereof adjacent the outside edge thereof,
   means to index said turret about a generally vertical axis,
   means to move said tool plate up and down in synchronism with the movement of said turret,
   said hopper member being adapted to support a plurality of said piece parts.

3. A machine for assembling piece parts comprising in combination,
   a turret,
   a tool plate,
   a support for piece parts,
   a feeding mechanism,
   means to move said tool plate, to index said turret and to actuate said feeder in synchronism with each other,
   said tool plate having spaced part receiving means on the side thereof adjacent said turret for receiving and holding piece parts from said feeding means,
   one said feeding means being supported on said machine adjacent each said part receiving means,
   said feeding means being adapted to move one said piece part from said supports each time said table indexes and to transfer said piece part to a said part receiving means,
   said means to move said feeding means and said tool plate being adapted to move said feeding means between said tool plate and said turret to move said part receiving means down to said feeding means, to move said feeding means from between said tool plate and said turret when said piece parts are engaged by said part receiving means, and to move said tool plate to bring said piece part into engagement with support means of said turret when said feeding means is retracted whereby said piece parts are loaded on said turret.

4. A machine for assembling piece parts comprising in combination,
   a turret and a tool plate each having a portion facing the other and each disposed in a plane parallel to the plane of the other,
   spaced piece part support members on said turret adjacent the outer edge thereof,
   spaced part receiving member on said tool plate in position spaced substantially equally to the spacing of said part supporting members on said turret,
   a part feeding means on said machine adjacent some of said part receiving member,
   transfer means for moving said parts from said feeding means to said receiving means, and
   drive means adapted to move said tool plate toward and away from said turret and adapted to index said turret in amounts equal to the spacing of said part supports and to move said feeding means,
   said machine having timing means for said driving means whereby said turret is indexed, said feeding means moves parts under said receiving means, said receiving means moves toward said part on said feeding means and receives said part, said feeding means moves out from under said receiving means, said receiving means is moved to bring said parts to said support means and said tool plate moves away from said turret.

5. A machine for assembling piece parts comprising
   a turret having a plurality of spaced piece parts support therein,
   a tool plate, spaced piece part holding means on said tool plate,
   means to index said turret whereby said spaced piece part supports are moved successively into operative relation with said piece part holding means,
   piece part storage members supported on said machine adjacent some of said piece part holding means,
   loading means on said machine adjacent said piece part storage means adapted to move piece parts from said storage means to a position between one said holding means and one said supports,
   and means synchronized with said indexing means and said loading means adapted to move said tool plate holding means to a position to engage piece parts on said loading means,
   and said loading means being adapted to retract when said holding means engage said articles on said loading means and said synchronized driving means being adapted to move said piece parts to engagement with said supports.

References Cited by the Examiner
UNITED STATES PATENTS

| | | | |
|---|---|---|---|
| 2,810,249 | 10/1957 | Wysocki | 53—317 |
| 3,065,530 | 11/1962 | Merchant et al. | 29—208 X |
| 3,143,792 | 8/1964 | Swanson et al. | 29—208 |

WHITMORE A. WILTZ, *Primary Examiner.*

THOMAS H. EAGER, *Examiner.*